May 21, 1968  R. F. LEOPOLD ET AL  3,383,986
ROTATING GUN MOUNT WITH RECIRCULATING BALL BEARING MEANS
Filed Dec. 30, 1966  3 Sheets-Sheet 2

INVENTORS:
RICHARD F. LEOPOLD,
EUGENE ASHLEY,
DONALD H. SPAWN,

BY *Harry C. Burgess*

THEIR ATTORNEY.

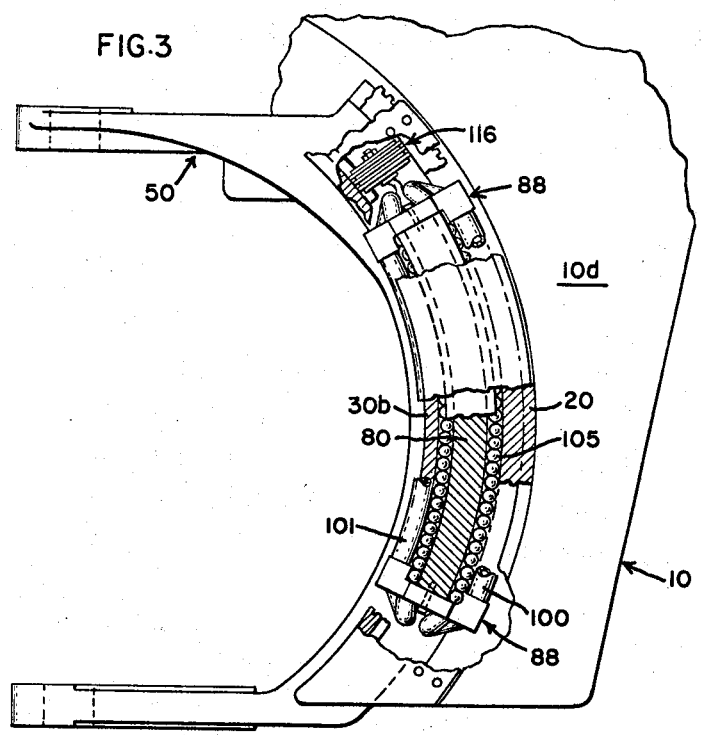
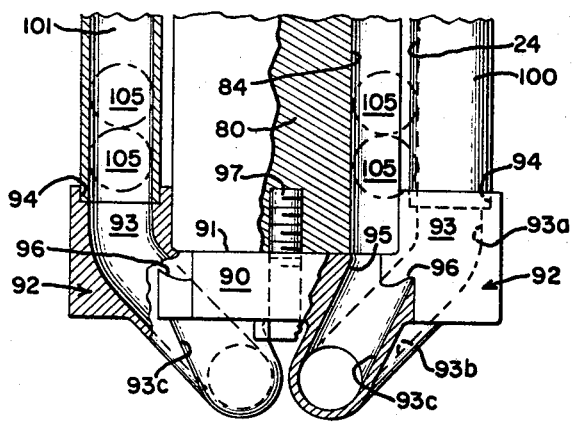
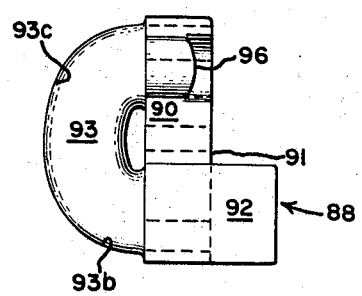
INVENTORS:
RICHARD F. LEOPOLD,
EUGENE ASHLEY,
DONALD H. SPAWN,
BY *Harry C. Burgess*
THEIR ATTORNEY.

United States Patent Office 3,383,986
Patented May 21, 1968

3,383,986
ROTATING GUN MOUNT WITH RECIRCULATING BALL BEARING MEANS
Richard Frank Leopold, South Burlington, Eugene Ashley, Burlington, and Donald Henry Spawn, South Burlington, Vt., assignors to General Electric Company, a corporation of New York
Filed Dec. 30, 1966, Ser. No. 606,211
6 Claims. (Cl. 89—37.5)

This invention relates generally to an improved mounting arrangement for armament and, more specifically, to a rotatable gun turret mount having a recirculating ball bearing arrangement.

Recent changes in guerilla warfare tactics have brought an increasing need for improvements in anti-personnel weapons. In particular, highly maneuverable aircraft, such as the helicopter, have been found to have great utility as mobile gun platforms. Efficient use of cannon or machine guns in an aircraft weapon installation requires a turret type arrangement whereby the gun can be sighted over a reasonably wide range of azimuth and elevation. To this end, use has been made of side turret mounts, for example, having gimbals for supporting the gun for universal movement over an arc of about 120° in azimuth and 50° in elevation. However, due to the fact helicopters and the like were not designed primarily to serve as gun platforms for weapons of this type it has been necessary to make certain design compromises. For example, in a side or forward location obviously the turret cannot be rotated 360°. Further, when weapons having very high rates of fire are utilized, such as a weapon of the Gatling-gun type having a plurality of barrels mounted for rotation about the gun axis, feeding the ammunition to the gun from a storage compartment in the aircraft raises certain problems. That is, the gun turret is effectively tied to the aircraft by a feed chute which, although somewhat flexible, does restrict gun motion. Moreover, the need to provide space for ejection of a large number of cartridge cases for gun firing at such high rates (e.g., 6000 shots per minute or greater) further limits the utility of conventional circular ball bearings for the gimbals.

Accordingly, a general object of the present invention is to provide an improved mounting arrangement of greater utility for an aircraft weapon installation.

A more specific object of the invention is an improved aircraft gun turret mount for use with a very high rate of fire weapon, the turret mount providing reciprocating rotation and movement in both azimuth and elevation, wherein the conventional fully circular ball bearing retaining means are eliminated to provide flexibility of gun motion and economy of structure heretofore not available in airborne installations.

Briefly, in the disclosed embodiment of our invention we provide an improved, partial (semi-circular) ballbearing assembly in a lightweight turret mounting arrangement for use in helicopter-type aircraft. The turret described includes a support or housing structure adapted to be securely fastened to the side of the aircraft fuselage and a gun saddle pivotally mounted on a motor driven gimbal. At the upper and lower edges of the housing are semi-circular grooves providing, respectively, one half of each of a first plurality of races for the improved ball bearing arrangement, according to a feature of our invention. A second or matching half of each of the upper and lower bearing races of the first plurality is provided by similar upper and lower grooves in a first surface on the azimuth gimbal portion of the gimbal and gun saddle assembly. A second pair of matching upper and lower bearing races are provided by oppositely facing grooves in further opposing surfaces located, respectively, on the azimuth gimbal portion of the gimbal and gun saddle assembly and an outer race support member comprising a flanged bearing retainer. Each upper and lower retaining member is so fastened to the housing as to provide a surface extending inwardly of the turret and having one of the semi-circular grooves therein.

In accordance with a primary feature of our invention the gimbal portions of the race pairs comprise only a partial segment of the arcuate housing wall. Means are provided for retaining ball bearings in the semi-circular or arcuate upper and lower races, including a pair of end caps and a pair of return tubes. The end caps close off each end of the joined or juxtaposed semi-circular ball race grooves, the caps having holes therethrough in registry with the inner and outer, upper and lower races for receiving the balls. The holes are, in turn, closed off by the return tubes which extend from one side of the gimbal wall to the other. The recirculating balls, which may be steel or plastic, thus reduce friction and wear, while increasing reliability in an extremely compact and flexible turret arrangement. Means are also provided for automatically cleaning the races as the turret swivels.

While the specification concludes with claims specifically pointing out our invention, nevertheless its operation and further objects and advantages thereof will be perhaps better understood from the following detailed description taken in conjunction with the accompanying drawings in which:

FIG. 3 is a partial plan view of the gimbal and housing, broken away to further illustrate the recirculating means for the ball bearings;

FIG. 5 is a segment, partially in cross-section, of one of the upper and lower races illustrating the end cap and recirculating tube assembly; and FIG. 6 is a side view of an end cap.

Figure 1:
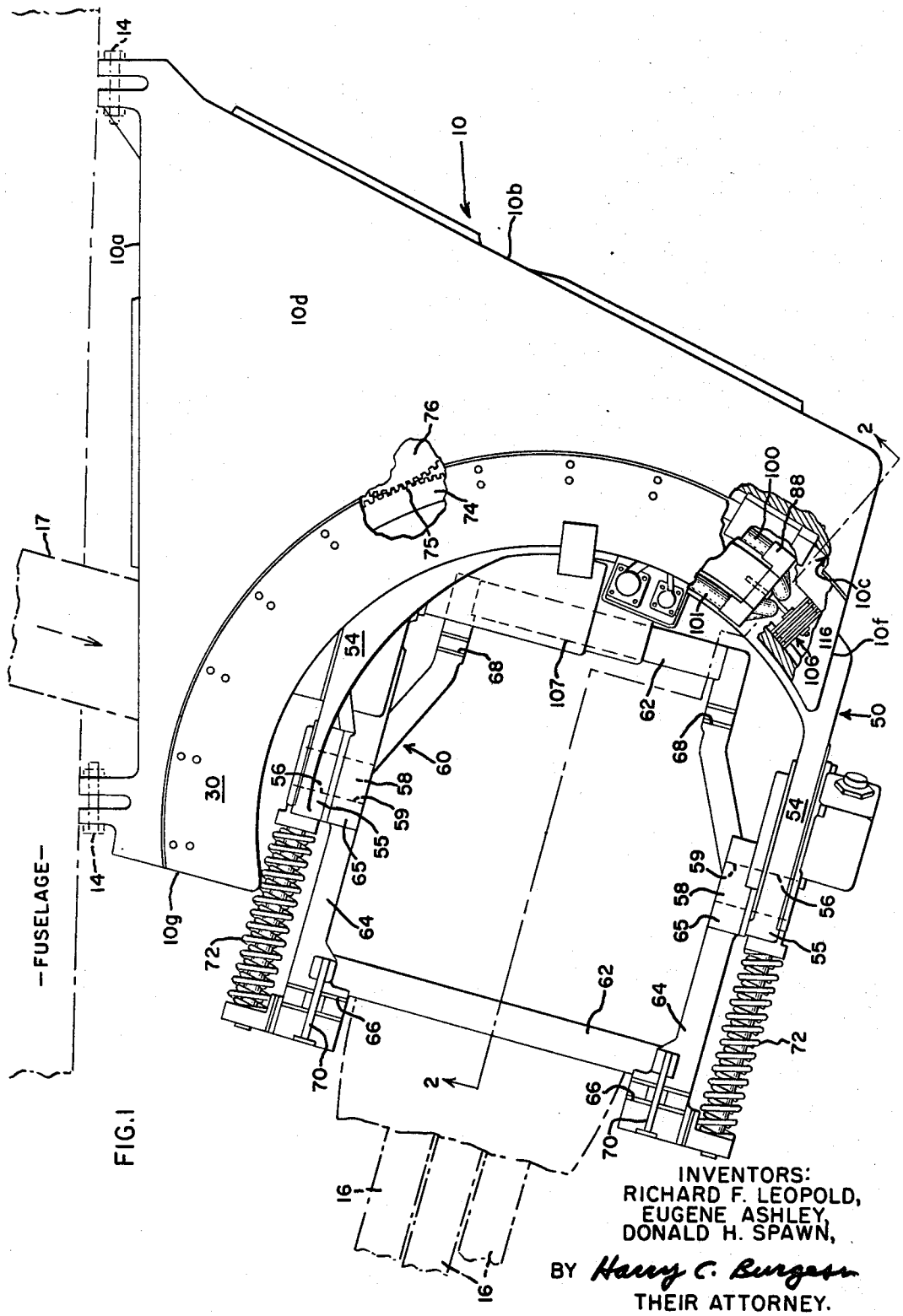
FIG. 1 is a plan view, partially in cross-section and broken away, illustrating an embodiment of our invention in a helicopter gun turret mount.

Turning now, more specifically, to FIG. 1, the main structural component comprising the turret support housing is indicated generally at 10. As shown, the turret is being utilized in a helicopter weapon system, the housing being secured to the vehicle fuselage by heavy front and rear bracket pairs indicated at 14—14. The gun, indicated by dotted lines at 16, is supplied with ammunition through a flexible chute partially shown at 17. The chute transfers ammunition from a storage container (not shown) in the vehicle. The turret support housing 10 comprises a single box-like casting of generally triangular shape, as seen in the plan view FIG. 1, having a first wall at 10a adjacent the fuselage, a rear wall at 10b, and a forward wall at 10c. The housing structure is completed by a top plate 10d and a bottom plate 10e, seen in FIG. 2. The forward wall of the housing structure may be considered a segment or portion of a cylinder, truncated at edges 10f and 10g of the structure, the wall 10c therefore being arcuate in plan view.

Figure 2:
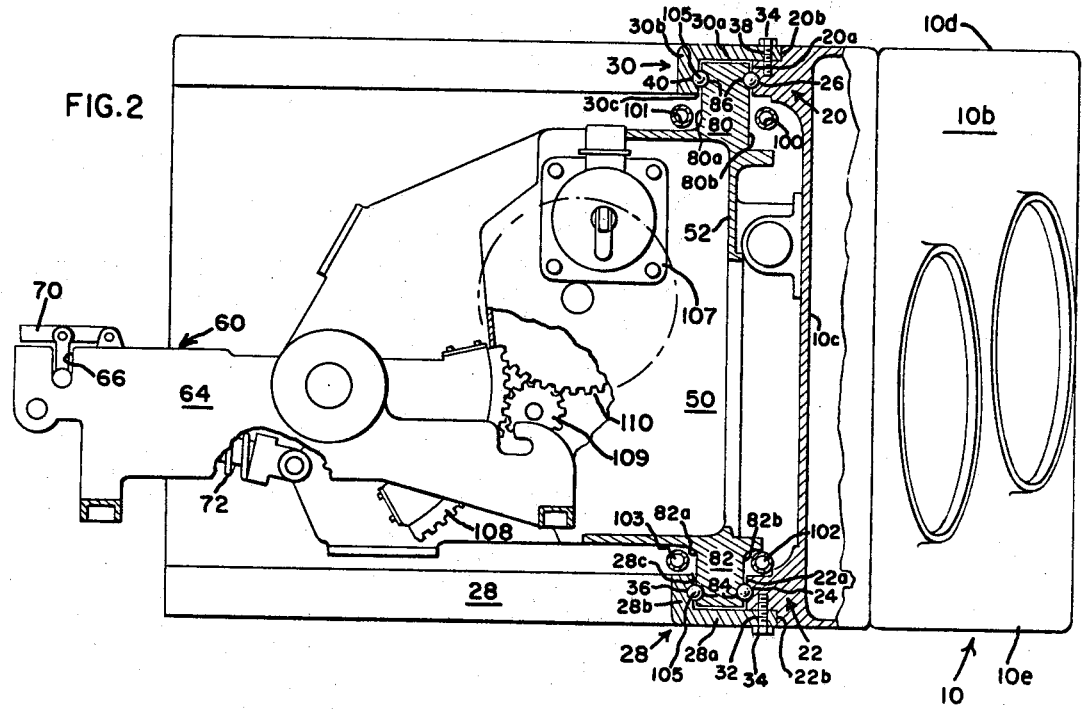
FIG. 2 is an external side elevation of the turret of FIG. 1 taken along line 2 of FIG. 1 and showing the semi-circular grooved surfaces in close abutment to capture the ball bearings.

In accordance with a primary feature of our invention, the arcuate wall portion of housing 10 is provided with upper and lower, outwardly projecting flanges or rails, indicated generally at 20 and 22, respectively, as perhaps best seen in FIG. 2. Each rail portion is substantially similar in construction and, in the case of rail 22, for example, comprises an outer surface 22a extending generally parallel to wall 10c, i.e., parallel to the projected axis of the cylinder of which the arcuate housing wall would be a part. The rail is cut away at 22b to form an arcuate seat for a bearing retainer member, described in detail hereinafter. Machined into the surface 22a is a semi-circular groove 24 which forms one half of the lower one of a pair of inner—with respect to the bearing arrangement—races for the improved ball-bearing arrangement of our invention. Upper rail 20 is identical in construction to lower rail 22 having a surface 20a, a seat 20b and a semi-circular groove 26, the latter likewise providing one-half of the other or upper, inner race.

To provide one half of each of the lower and upper *outer* races, means in the form of arcuate bearing retainer members 28 and 30, respectively, are provided. These are both generally L-shaped in cross section, as seen in FIG. 2, retainer member 28, for example, having a relatively thin flange portion 28a arranged to extend over the bearing races, with the tip edge thereof being received in seat 22b of rail 22 of the housing wall 10c, as shown in the drawing. Holes 32 are provided adjacent the tip edge, the holes receiving fastening means in the form of bolts 34 for securing the flange 28a to the housing 10. The other, or base leg of the L-shaped retainer is indicated at 28b. The latter extends inwardly of the structure—when the flange 28a is on seat 22b—to provide a surface 28c in opposition to and substantially co-extensive in depth with surface 22a of housing rail 22. Surface 28c of the retainer flange likewise contains a semi-circular, circumferentially extending groove 36 arranged at the same elevation with respect to the bearing structure as is groove 24. Groove 36 thus provides one-half of the lower one of a pair of outer races located at the top and bottom respectively, of the turret.

Similarly, L-shaped retainer member 30 has a laterally-projecting, relatively thin flange section 30a having holes 38 therethrough for attaching the retainer to the housing rail, using bolts 34, adjacent the upper rail portion 20 thereof. Retainer member 30 also has an inwardly projecting base flange portion 30b having a surface 30c in opposition to and substantially co-extensive with surface 20a of rail 20. Surface 30c has a circumferentially extending semi-circular groove 40 therein, which, provides one-half of the outer upper ball-bearing race.

The structural parts described above comprise what may be termed the "static" portion of the gun turret assembly. As seen in FIGS. 1 and 2 the turret also includes means providing reciprocating rotatable movement of the gun 16 in azimuth, i.e., about a vertical axis, including a gimbal and saddle indicated generally at 50 and 60, respectively. The gimbal, preferably an integral casting, includes an arcuate wall 52 which, like wall 10c of the housing, may be considered as a segment of a cylinder cut longitudinally along its edges. In this instance, the truncated cylinder wall 52 is provided with a pair of generally triangular support arms 54—54 extending outwardly of the wall 52 and substantially parallel to each other. Each arm 54 has a pad or boss 55 at the extremity thereof machined or bored out at 56 to provide a mount for a pivot pin 58. The pivot pins 58—58 are fixed in the holes 56 and project inwardly of the gimbal arms 54—54 being received in openings 59 in the gun saddle 60. The saddle 60 is a generally rectangular structure having a pair of spaced end rails 62—62 and side rails 64—64, each of the latter having a pad portion 65 containing one of the pivot pin mounting holes 59. Mounting slots 66—66 are machined in the upper surface of the side arms 64—64, just forward of the end rail 62, to accept gun trunnions (not shown). The rear of the gun is retained in a second pair of slots 68—68 at the rear of the side rails. The front gun trunnions are locked in slots 66—66 by suitable clamping means, indicated generally at 70—70. A pair of springs 72—72 serve to counter-balance the weight of the gun in the saddle to control its movement in elevation with respect to the gimbal, the springs being connected at their respective ends between the gimbal and the saddle members. As seen in FIG. 1, the upper edge of the gimbal wall 52 provides a mounting surface for a sector gear 74 having a plurality of teeth adapted to mesh at 75 with the teeth of a driving gear 76. Gear 76 is attached to the shaft of a suitable power source, such as an electric motor (not shown) suitably mounted within housing 10.

As stated above, and as will be obvious from FIG. 1, the requirements for mounting turrets on helicopters presents certain problems with respect to bearing locations. That is, with side or possibly front mounting also, the conventional fully circular (360°) peripheral bearing arrangement for a turret drive cannot be used. Azimuth motion about the gimbal centerline is required, however, and in the helicopter installation shown the gun would interfere with normal bearing location points. On the other hand, use of small size bearings set closer to the axis and positioned above and below the gun could interfere with the rather complex cartridge feed and ejection mechanism utilized with a very high rate of fire Gatling-gun type of weapon. To complete our novel and compact bearing assembly, therefore, we provide a short arcuate bearing support means on the gimbal 50. Specifically, along a portion of the top and bottom edges of the wall 52, are a pair of ribs, indicated at 80 and 82, respectively in FIG. 2. As shown in the drawing, the ribs project upwardly and downwardly and they are substantially identical, having oppositely facing, vertically extending surfaces 80a and 80b and 82a and 82b, respectively. Rib 80 is positioned between surface 30c of leg 30b and surface 20a of bearing retainer member 30 and rail 20, respectively. As shown, surfaces 30c and 80a are juxtaposed and in substantial abutment, as are surfaces 80b and 20a. Similarly, at the lower rib 82, surfaces 82a and 28c, as well as surfaces 82b and 22a, respectively, are in close juxtaposition. To complete each race of the pairs of inner and outer races, one of each pair being at the bottom and top of the turret, respectively, we provide matching circumferentially-extending, semi-circular grooves 84—84 and 86—86 in ribs 82 and 80, respectively. Thus, grooves 84—84 are in surfaces 82a and 82b and grooves 86—86 are in surfaces 80a and 0b. Pairs of ball-bearing races are therefore provided at the top and bottom of the gimbal-to-housing connection to carry radial and thrust loads in the turret, as well as the moment load of the cantilevered gun 16.

A feature of our invention, therefore, is an extremely compact ball bearing arrangement which, nevertheless, provides an extremely flexible gun turret mount particularly adaptable for carrying the loads occasioned by helicopter use. To this end, and to provide a more reliable, freely moving bearing for reduction of wear due to friction under such loads, means have been devised to recirculate the ball bearings in the dual races and, at the same time, facilitate and ensure the free running of the balls. Specifically, as seen in FIGS. 3, 5 and 6, at each end of the upper and lower pairs of races is an end cap 88. Since the end caps 88, four in number, are identical only one will be described. As seen in the drawings, each cap comprises a flat body portion 90, a mounting surface 90, a mounting surface 91, and a pair of enlarged ear or tube mounting lug portions 92—92. The lugs 92—92 project outwardly of mounting surface 91 on either side of body portion 90. It will be noted that the caps include through passages 93—93, for the bearing means. The passages each comprise short axial portions 93a—93a, first angled portions 93b—93b, and second angled portions 93c—93c. One end of the passages 93—93 open at 94—94 in the lug surfaces, the other ends of the passages being connected at 95—95 with the ball races formed by opposing semi-circular lips 96—96 which form inside surfaces of the second angled passage portions 93c—93c at openings 95—95.

The openings so formed at 95—95 and 94—94 function to receive or discharge, i.e., re-circulate balls from or to the several ball races in cooperation with further means described hereinbelow. Thus, end caps 88—88 are firmly fixed at each end of the upper and lower ribs 80 and 82 respectively, of the gimbal 50 by suitable fasteners, e.g., bolts 97 extending through suitable holes in the body portion 90, the bolts being threadably engaged in holes in the ribs. Since the rib width and the width of the body portion 90 are substantially identical, the outermost ends of the passages 93—93 join in alignment with the ball races, with lips 96—96 helping to direct the balls into a continuation of each race in the end caps 88 provided by the passages. Further means are provided at the openings 94—94 at the surfaces of the lugs, i.e., at each of the vertical edges of ribs 80 and 82, to connect the several races, in the form of four recirculating tubes indicated at 100, 101, 102 and 103, respectively, as seen in FIG. 2. Thus, inner and outer tubes 100 and 101, for example, are on opposite sides of rib 80 at the top of the gimbal 50, with tubes 102 and 103 being likewise arranged along the bottom of the gimbal on either side of rib 82. Obviously, the end caps 88—88 and passages 93—93 could comprise a fabricated plate and tube arrangement. In any event, the movement of the ball bearings, indicated at 105, will be back and forth as they are entrained in the lower races or matching, opposed grooves 84–24 and 84–36, as well as in the upper races or matching grooves 86–26 and 86–40.

It will be clear, therefore, that as power is applied to move the gun 16 in azimuth, the gears 74–76 will drive the gimbal 50 about the turret axis, or projected centerline with respect to housing wall 10c and gimbal wall 52, both of which are essentially concentric about the centerline or axis. The balls 105 will be free-running and recirculating in the short, compact and arcuate races describes above.

Movement of the gun 16 in elevation may be provided by suitable power means in the form of a motor 107 driving sector gear 108, affixed to the saddle, through intermeshing shaft gears 109 and 110, driven by a pinion gear on the motor 107, as indicated in FIG. 2.

Figure 4:
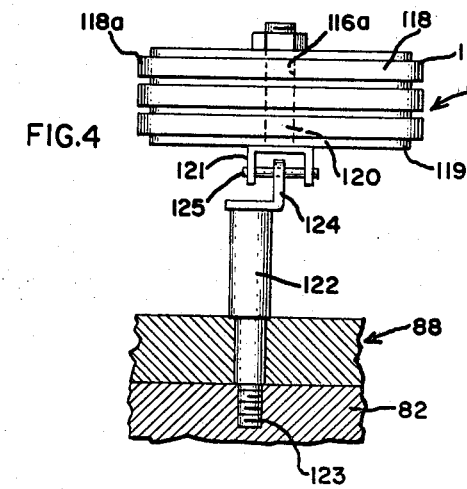
FIG. 4 is an enlarged view of a wiper assembly.

In addition, since each gimbal rib is only a partial segment of the opposing housing rail, automatic cleaning means in the form of felt wipers, indicated generally at 116 in FIGS. 3 and 4, are provided to scrape the outer, or housing and retainer grooves clean as the gimbal turns. This increases the reliability of our improved ball bearing means. The wipers 116 each comprise a plurality of felt pieces 118 spaced by separators 119 which are bonded thereto. The wiper felts have semi-circular ends at 118a and 118b configured to substantially mate with and thus scrub the walls of the respective grooves in the housing rails and retainer members. A bolt 120 having a coupler 121 at one end thereof is received in a hole 116a in the bonded wiper assembly. A stud 122, threaded at 123 for engagement with a threaded hole in the gimbal wall 80 or 82, is attached at the other end thereof to the coupler 121 on bolt 120 using a second coupler 124 and pin 125, as shown in FIG. 4. This enables the wiper 116 to pivot as it follows the arcuate path of the relatively moving housing and rib race portions.

What we claim and desire to secure by Letters Patent of the United States is:

1. In air aircraft gun turret having support structure including an upstanding semi-cylindrical outer housing wall, a gimbal located adjacent the housing wall, means on the gimbal supporting the gun for movement in elevation, the improvement of bearing means providing movement of the gimbal in azimuth comprising:

a plurality of arcuate retainer members each member including means for attaching the member to the upper and lower edges, respectively, of the semi-cylindrical housing wall, each of said members having a vertical wall surface in opposition to a portion of the upstanding housing wall;

second wall means projecting vertically outwardly of the gimbal, said second wall means being longitudinally arcuate and having oppositely facing surfaces received between the opposing wall surfaces, respectively, on said retainer members and said housing wall portions opposite thereto;

inner and outer races located at both the upper and lower edges of the housing wall and comprising first pairs of oppositely facing grooves, in the opposing surfaces of the housing wall portions and said second wall means, respectively, forming said inner races, and second pairs of oppositely facing grooves in the opposing surfaces of said second wall means and said vertical walls of said retainer members, respectively, forming said outer races;

movable bearing means received in the inner and outer pairs of races; and means including a plurality of end caps of substantial cross-section each having passages therethrough, respective ones of said plurality being affixed to the gimbal at each side of the arcuate second wall means thereof with the ends of the passages opening at one surface of the end cap connecting with both the inner and outer races, respectively, and a plurality of tubular members connecting the other ends of said passages on one side to the said other ends of said passages on the opposite side of said second wall means at the upper and lower, inner and outer races, respectively, for recirculation of said movable bearing means from one side of said second wall means to the other, and vice-versa, during movement in azimuth.

2. In an aircraft gun turret having support structure including an upstanding semi-cylindrical outer housing wall, a gimbal located adjacent the housing wall, means on the gimbal supporting the gun for movement in elevation, the improvement of bearing means providing movement of the gimbal in azimuth comprising:

first wall means having vertical surfaces in opposition to respective portions of the upstanding housing wall along the upper and lower edges thereof;

second wall means projecting vertically outwardly of the gimbal and having oppositely-facing surfaces received between and in juxtaposition with the respective opposing first wall means surfaces and housing wall portions of said upper and lower edges;

matching grooves in both respective ones of said oppositely-facing second wall means surfaces and the first wall means surfaces and housing wall portions in juxtaposition therewith, said matching grooves forming pairs of races extending along said upper and lower edge, respectively;

movable bearing means received in said pairs of races; and means for recirculating said movable bearing means in said races including first passages at said upper edge connecting the ends of each of the races of one of said pairs at one side of the gimbal with like race ends at the other side of the gimbal, and second passages at said lower edge likewise connecting the ends of the races of the other of said pairs at said one side with like race ends at said other side of said signal.

3. The apparatus of the invention according to claim 2 wherein said first wall means comprises a pair of retainer members arcuate in plan view, each of said retainer members being L-shaped in cross-section with one arm of the L-shaped member having means for attaching said member to the semi-cylindrical housing wall at said upper and lower edges, respectively, the other arm of said L-shaped member overlying said housing wall portions to provide said vertical surfaces in opposition thereto.

4. The apparatus of the invention according to claim 2 wherein said matching grooves are semi-circular in configuration and said movable bearing means comprises a plurality of ball bearings in substantial abutment with one another in said races.

5. The apparatus of the invention according to claim 4 wherein said recirculating means comprises, in combination, pairs of end caps, respective ones of said caps being affixed to said second wall means at either side thereof adjacent said upper and lower edges, respectively, said caps having passages therethrough, a plurality of tubes of circular cross-section connecting respective ones of the passages of each end cap to a like passage in the cap at the other side of said second wall means at the respective upper and lower edges, whereby said ball bearings continuously recirculate from one side of said gimbal to the other, and vice versa, during movement of said gimbal in azimuth, and further, wherein said apparatus includes wiper means affixed to each of said caps and projecting into the grooves in said first wall means and said housing wall portions exposed by relative movement of said second wall means with respect thereto for automatic cleaning thereof during said movement in azimuth.

6. An aircraft gun turret comprising:
- a housing having means for attaching the housing to the aircraft fuselage, said housing including a first upstanding semi-cylindrical outer wall;
- means including a gimbal supporting the gun for movement in azimuth and elevation, said gimbal having a second upstanding semi-cylindrical outer wall having oppositely facing surfaces thereon, one of said surfaces being in substantial abutment with a surface of said first housing wall.
- retainer means respectively supported on the upper and lower edges of said housing wall and overlying the ends of the second semi-cylindrical wall on said gimbal, said retainer means each having a third wall partially overlapping the other of said oppositely-facing gimbal wall surfaces, said third walls having surfaces in substantial abutment with said other gimbal wall surface;
- bearing races in the respective substantially abutting surfaces at said upper and said lower housing wall edges, respectively;
- bearing means movably received in said races; and
- means including a first plurality of passages arranged along the upper edge of said gimbal wall and joining the ends of the races at one side of said gimbal wall with the respective ends of the races at the other side of said gimbal wall, and a second plurality of passages arranged along the lower edge of said gimbal wall and joining the ends of the races at said one side with the respective ends of the races at said other side, whereby said movable bearing means recirculate from one side of said gimbal to the other, and vice-versa, during movement in azimuth.

References Cited

UNITED STATES PATENTS 2,199,971 5/1940 Sanders.
2,364,425 12/1944 Corte _____ 87—37.5

FOREIGN PATENTS 802,051 5/1936 France.

BENJAMIN A. BORCHELT, *Primary Examiner.*

S. C. BENTLEY, *Assistant Examiner.*